United States Patent
Gill

(10) Patent No.: US 6,693,776 B2
(45) Date of Patent: *Feb. 17, 2004

(54) SPIN VALVE SENSOR WITH A SPIN FILTER AND SPECULAR REFLECTOR LAYER

(75) Inventor: Hardayal Singh Gill, Palo Alto, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 203 days.

This patent is subject to a terminal disclaimer.

(21) Appl. No.: 09/803,196

(22) Filed: Mar. 8, 2001

(65) Prior Publication Data

US 2002/0126426 A1 Sep. 12, 2002

(51) Int. Cl.[7] .................................................. G11B 5/39
(52) U.S. Cl. .............................. 360/324.12; 360/324.11; 360/314
(58) Field of Search ........................ 360/324.12, 324.11, 360/314, 317; 29/603.7; 428/692, 693

(56) References Cited

U.S. PATENT DOCUMENTS

| | | | | |
|---|---|---|---|---|
| 6,205,008 B1 | * | 3/2001 | Gijs et al. | 360/324 |
| 6,348,274 B1 | * | 2/2002 | Kamiguchi et al. | 428/692 |
| 6,407,890 B1 | * | 6/2002 | Gill | 360/314 |
| 6,428,657 B1 | * | 8/2002 | Pinarbasi | 204/192.11 |
| 2002/0055307 A1 | * | 5/2002 | Singleton et al. | 439/887 |
| 2002/0085322 A1 | * | 7/2002 | Pinarbasi | 360/324.12 |
| 2002/0126428 A1 | * | 9/2002 | Gill | 360/324.12 |
| 2002/0145836 A1 | * | 10/2002 | Gill | 360/324.12 |
| 2002/0159198 A1 | * | 10/2002 | Pinarbasi | 360/313 |

* cited by examiner

Primary Examiner—William Klimowicz
(74) Attorney, Agent, or Firm—Ervin F. Johnston

(57) ABSTRACT

A half metallic phase iron oxide ($Fe_3O_4$) layer is employed in either or both of a pinned layer structure and a free layer structure in a spin valve sensor for filtering minority electrons and reflecting majority electrons with respect to a spin scattering region for increasing the magnetoresistive coefficient dr/R of a spin valve sensor.

15 Claims, 8 Drawing Sheets

(ABS)

SPIN VALVE SENSOR WITH A SPIN FILTER AND SPECULAR REFLECTOR LAYER

BACKGROUND OF THE INVENTION

1. Field of the Invention

The present invention relates to a spin valve sensor with a spin filter and specular reflector layer and, more particularly, to a spin valve sensor which has a free layer structure and/or pinned layer structure with such a layer composed of half metallic phase iron oxide ($Fe_3O_4$).

2. Description of the Related Art

The heart of a computer is a magnetic disk drive which includes a rotating magnetic disk, a slider that has read and write heads, a suspension arm above the rotating disk and an actuator arm that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

An exemplary high performance read head employs a spin valve sensor for sensing the magnetic signal fields from the rotating magnetic disk. The sensor includes a nonmagnetic electrically conductive first spacer layer sandwiched between a ferromagnetic pinned layer structure and a ferromagnetic free layer structure. An antiferromagnetic pinning layer interfaces the pinned layer structure for pinning a magnetic moment of the pinned layer structure 90° to an air bearing surface (ABS) wherein the ABS is an exposed surface of the sensor that faces the magnetic disk. First and second leads are connected to the spin valve sensor for conducting a sense current therethrough. A magnetic moment of the free layer structure is free to rotate upwardly and downwardly with respect to the ABS from a quiescent or bias point position in response to positive and negative magnetic field signals from a rotating magnetic disk. The quiescent position, which is preferably parallel to the ABS, is the position of the magnetic moment of the free layer structure with the sense current conducted through the sensor in the absence of signal fields.

The thickness of the spacer layer is chosen so that shunting of the sense current and a magnetic coupling between the free and pinned layer structures are minimized. This thickness is typically less than the mean free path of electrons conducted through the sensor. With this arrangement, a portion of the conduction electrons are scattered at the interfaces of the spacer layer with the pinned and free layer structures. When the magnetic moments of the pinned and free layer structures are parallel with respect to one another scattering is minimal and when their magnetic moments are antiparallel scattering is maximized. Changes in scattering changes the resistance of the spin valve sensor as a function of $\cos\theta$, where $\theta$ is the angle between the magnetic moments of the pinned and free layer structures. The sensitivity of the sensor is quantified as magnetoresistive coefficient dr/R where dr is the change in the resistance of the sensor as the magnetic moment of the free layer structure rotates from a position parallel with respect to the magnetic moment of the pinned layer structure to an antiparallel position with respect thereto and R is the resistance of the sensor when the magnetic moments are parallel.

In addition to the spin valve sensor the read head includes nonconductive nonmagnetic first and second read gap layers and ferromagnetic first and second shield layers. The spin valve sensor is located between the first and second read gap layers and the first and second read gap layers are located between the first and second shield layers. In the construction of the read head the first shield layer is formed first followed by formation of the first read gap layer, the spin valve sensor, the second read gap layer and the second shield layer. Spin valve sensors are classified as a top or a bottom spin valve sensor depending upon whether the pinning layer is located near the bottom of the sensor close to the first read gap layer or near the top of the sensor close to the second read gap layer. Spin valve sensors are further classified as simple pinned or antiparallel pinned depending upon whether the pinned layer structure is one or more ferromagnetic layers with a unidirectional magnetic moment or a pair of ferromagnetic layers that are separated by a coupling layer with magnetic moments of the ferromagnetic layers being antiparallel. Spin valve sensors are still further classified as single or dual wherein a single spin valve sensor employs only one pinned layer and a dual spin valve sensor employs two pinned layers with the free layer structure located therebetween.

There is a continuing effort to increase the magnetoresistive coefficient dr/R of the spin valve sensor. As indicated above a greater difference between the resistances of the spin valve sensor between the case where the magnetic moments of the free and pinned layers are parallel and the case where the magnetic moments of the free and pinned layers are antiparallel will result in a greater magnetoresistive coefficient dr/R. It is a purpose of this invention to increase the aforementioned difference of the resistances of the spin valve sensor so as to increase the magnetoresisitve coefficient dr/R.

SUMMARY OF THE INVENTION

The present invention provides the spin valve sensor with a half metallic phase iron oxide ($Fe_3O_4$) in association with the free layer structure and/or the pinned layer structure. The iron oxide layer serves a dual purpose, namely: (1) it reflects majority electrons back into the spin dependent region of the sensor and (2) it filters out minority electrons so that they are no longer present in the spin dependent region. The classification of electrons as majority and minority electrons depends upon the orientation of the magnetization of the layer (free or pinned) through which the electron is conducted. An example is where the iron oxide interfaces the pinned layer with the pinned layer located between the spacer layer and iron oxide layer. Assuming a first case where the magnetization of the pinned layer is directed upwardly into the sensor and a signal field has rotated the magnetization of the free layer upwardly into the head, electrons which spin downwardly are minority electrons and will be filtered out of the spin dependent region by the iron oxide layer and the electrons which spin upwardly in the same direction as the magnetization of the free layer are majority electrons and will be reflected back into the spin dependent region by the iron oxide layer. This is a low resistance state of the sensor to the sense current. Assuming a second case where the magnetization of the pinned layer is still the same but the magnetization of the free layer has been rotated downwardly out of the head, the spin down electrons are still filtered out of the spin dependent region by the pinned layer structure since they are antiparallel to the magnetization of the pinned layer, but the spin up electrons are now antiparallel to the magnetization of the free layer structure and are minority electrons and have a short mean free path which raises the resistance of the sensor to the sense current. As compared to a spin valve sensor without the iron oxide layer the difference between the low and high resistance state of the sensor is greater in the spin valve sensor with the iron oxide layer which results in a greater magnetoresistive coefficient dr/R. Additional information on the conduction electrons can be found in commonly assigned U.S. Pat. No. 5,422,571 which is incorporated by reference herein.

Another important advantage of the iron oxide layer is that it performs its improvement of the magnetoresistive coefficient dr/R without shunting the sense current. This is because the iron oxide layer is an insulator instead of a conductor. It should be understood that the output signal of the sensor is reduced when the sense current is shunted by a conductive layer in the sensor.

An object of the present invention is to increase the magnetoresistive coefficient dr/R of a spin valve sensor without shunting the sense current.

Other objects and attendant advantages of the invention will be appreciated upon reading the following description taken together with the accompanying drawings.

DESCRIPTION OF THE PREFERRED EMBODIMENTS

Magnetic Disk Drive

Figure 1:
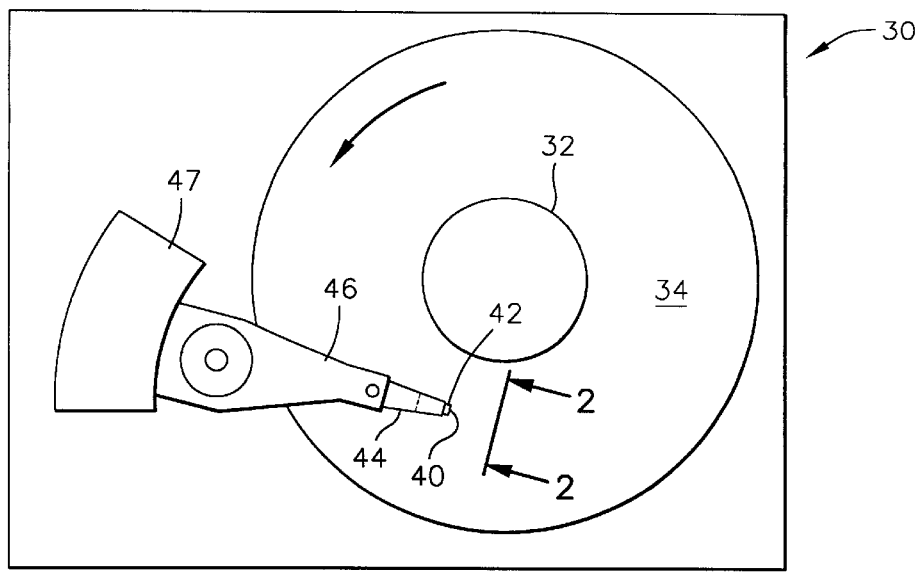
FIG. 1 is a plan view of an exemplary magnetic disk drive.
Figure 2:
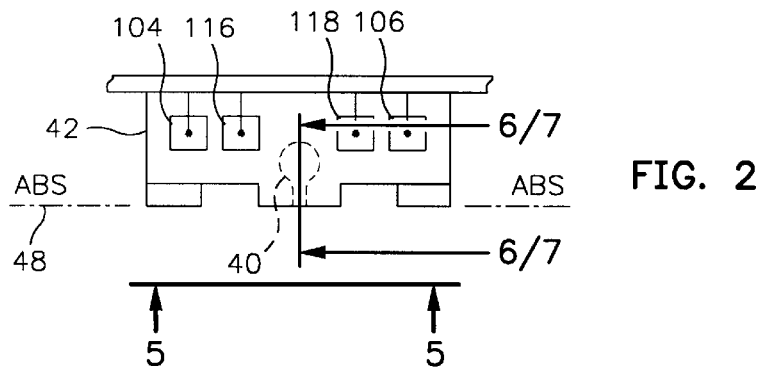
FIG. 2 is an end view of a slider with a magnetic head of the disk drive as seen in plane 2—2 of FIG. 1.
Figure 3:
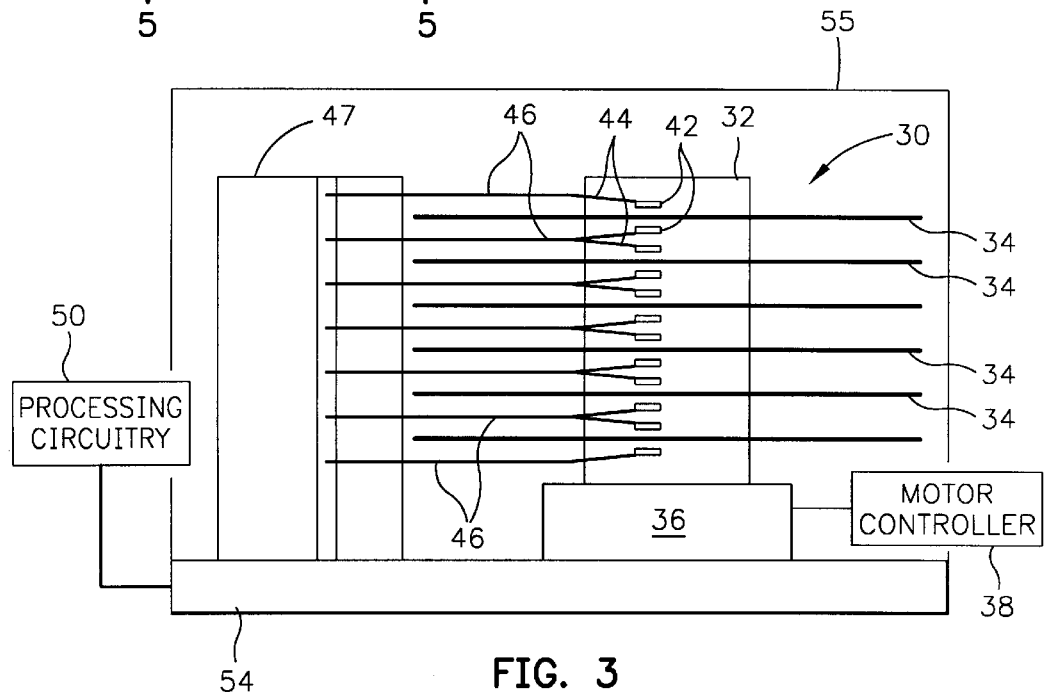
FIG. 3 is an elevation view of the magnetic disk drive wherein multiple disks and magnetic heads are employed.
Figure 4:
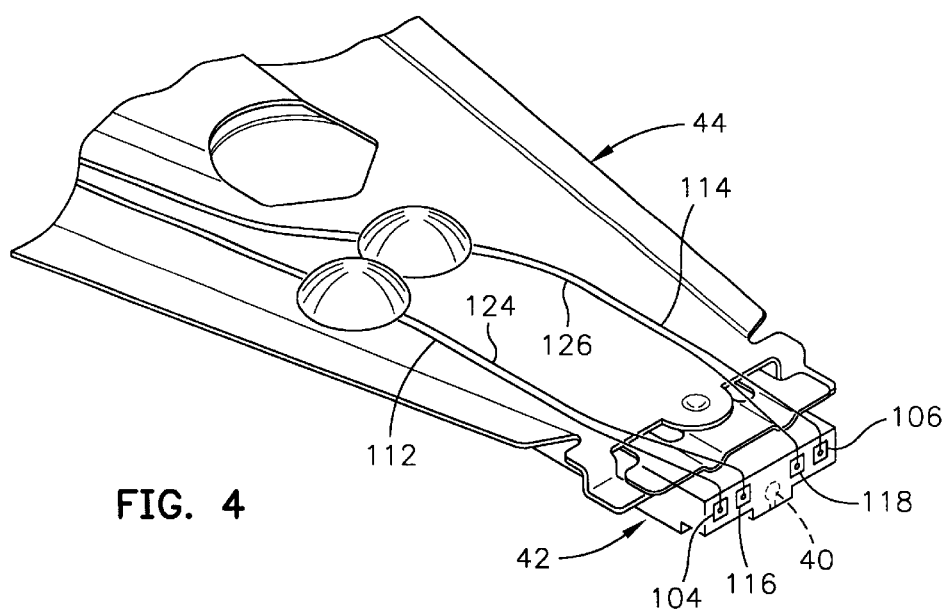
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing, as shown in FIG. 3.

Figure 5:
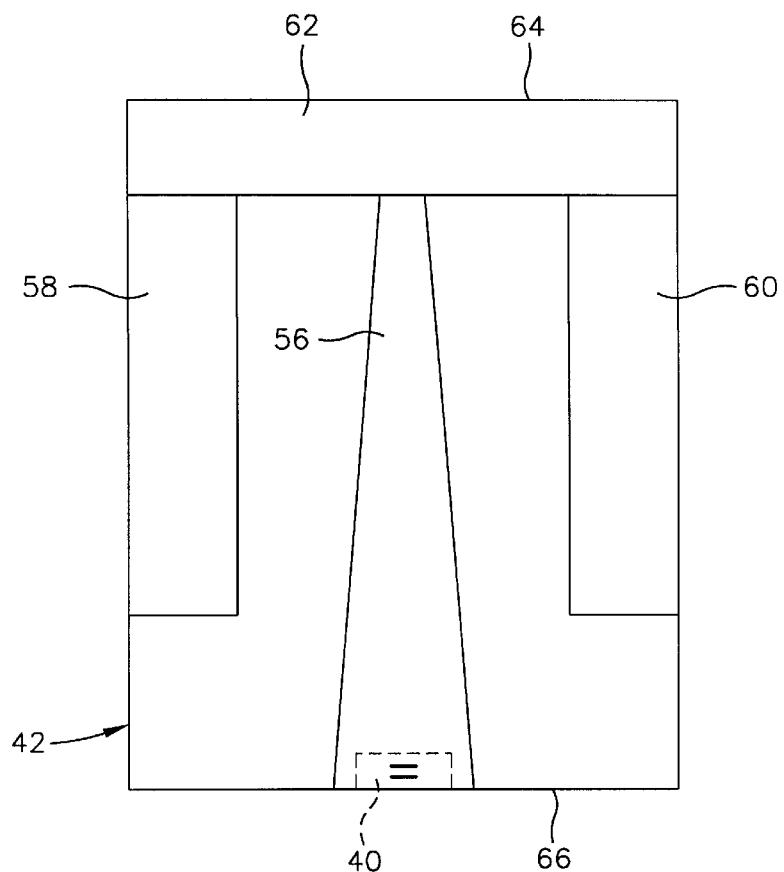
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
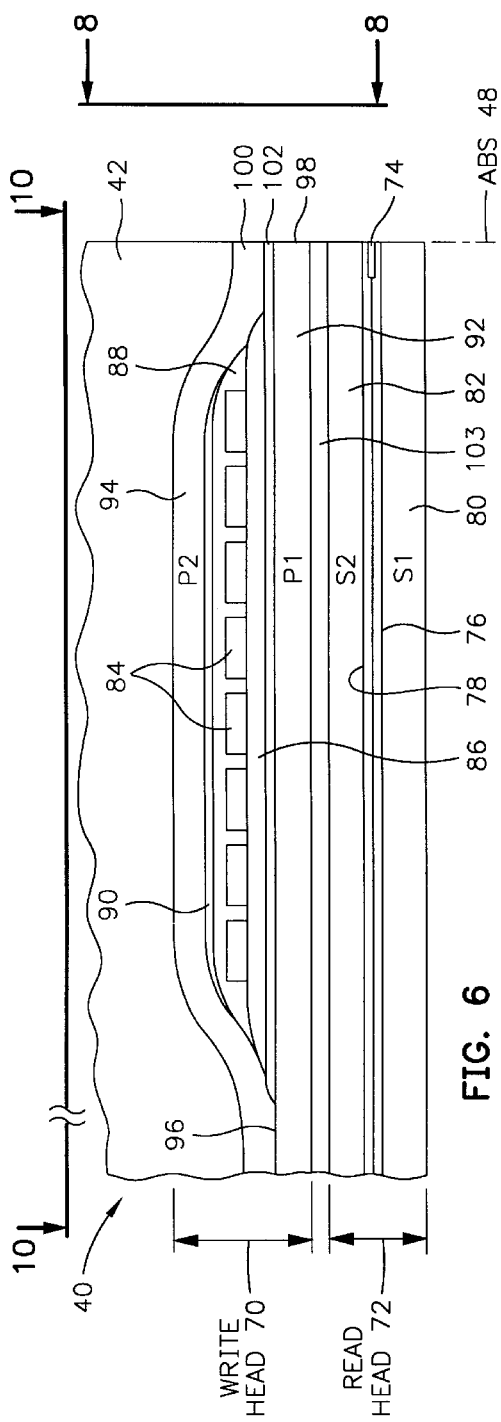
FIG. 6 is a partial view of the slider and a piggyback magnetic head as seen in plane 6—6 of FIG. 2.
Figure 8:
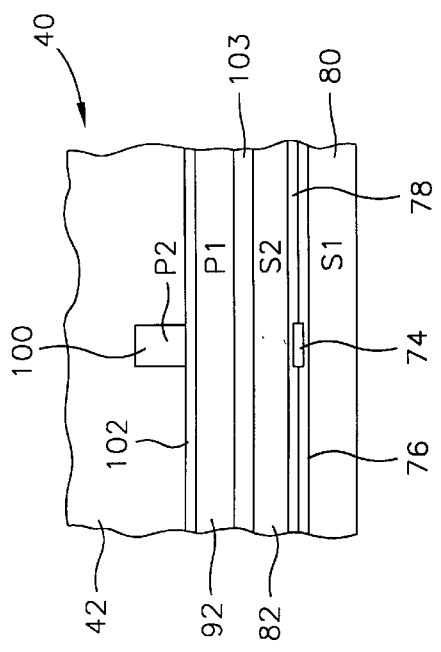
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing a dual spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_S$ conducted through the sensor causes these resistance changes to be manifested as potential changes. These potential changes are then processed as readback signals by the processing circuitry 50 shown in FIG. 3.

Figure 10:
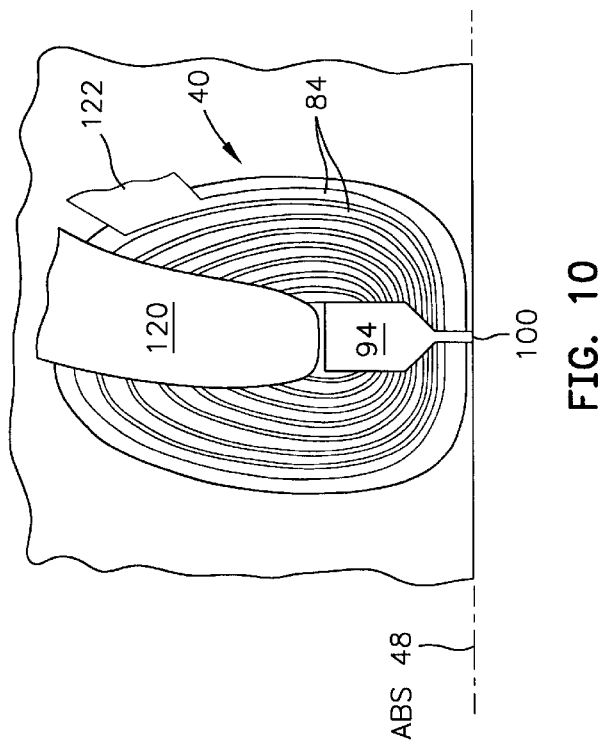
FIG. 10 is a view taken along plane 10—10 of FIG. 6 or 7 with all material above the coil layer and leads removed.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 10) to leads 124 and 126 on the suspension.

Figure 7:
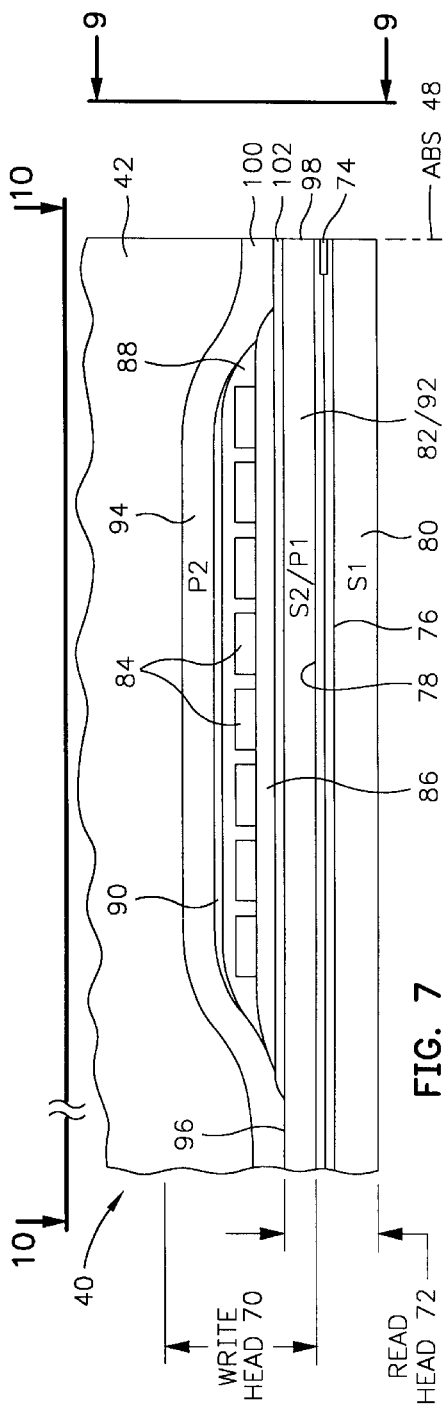
FIG. 7 is a partial view of the slider and a merged magnetic head as seen in plane 7—7 of FIG. 2.
Figure 9:
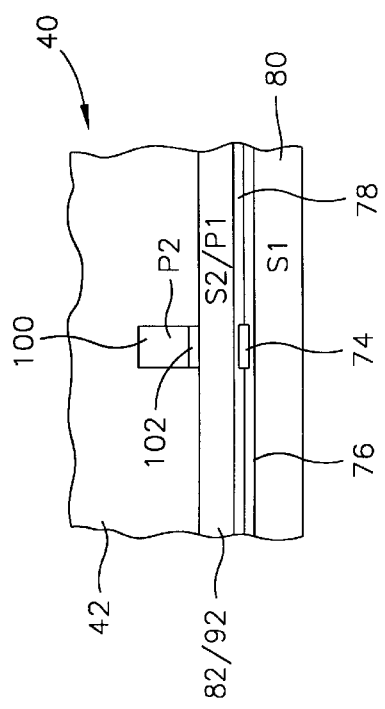
FIG. 9 is a partial ABS view of the slider taken along plane 9—9 of FIG. 7 to show the read and write elements of the merged magnetic head.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 11:
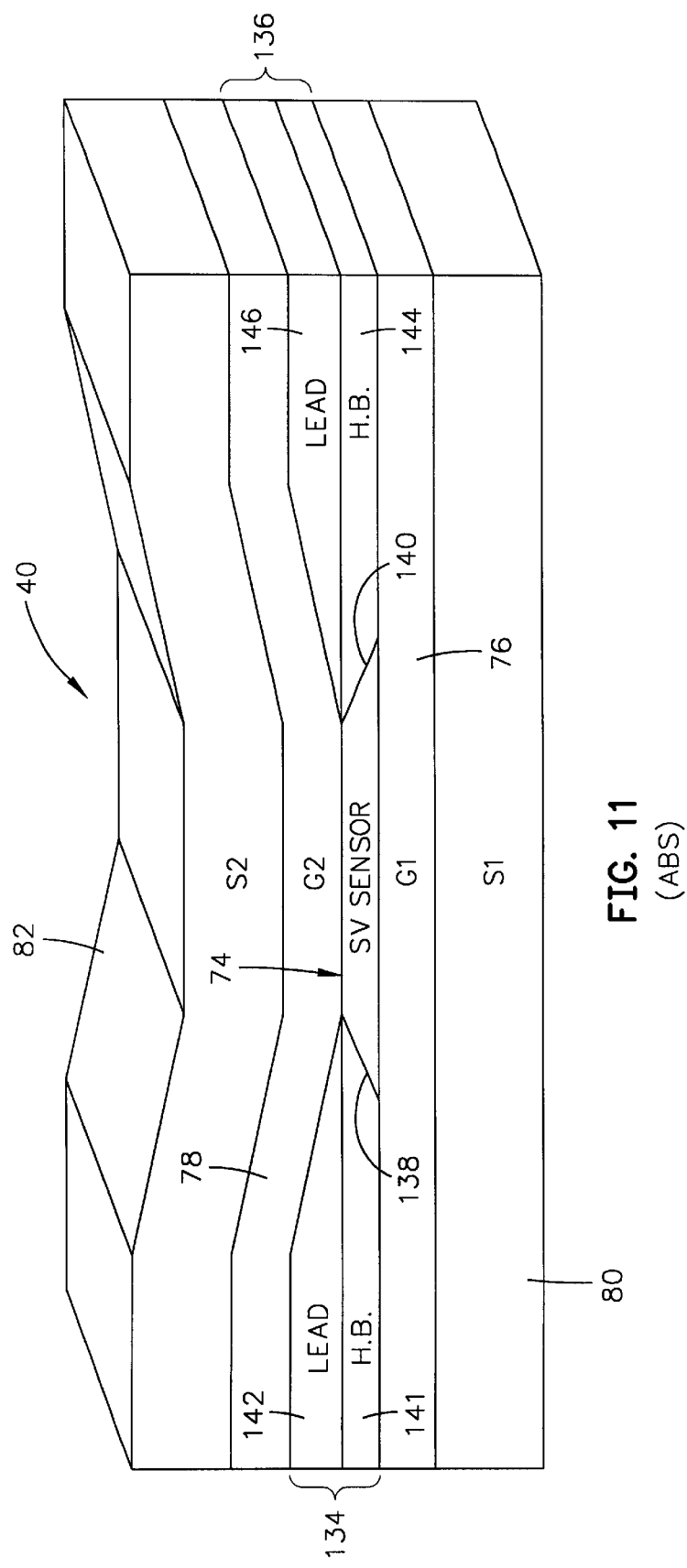
FIG. 11 is an enlarged isometric illustration of the read head with a spin valve sensor.

FIG. 11 is an isometric ABS illustration of the read head 40 shown in FIG. 8 or 9. The read head 40 includes the spin valve sensor 74. First and second hard bias and lead layers 134 and 136 are connected to first and second side edges 138 and 140 of the spin valve sensor. This connection is known in the art as a contiguous junction and is fully described in commonly assigned U.S. Pat. No. 5,018,037 which is incorporated by reference herein. The first hard bias and lead layers 134 include a first hard bias layer 141 and a first lead layer 142 and the second hard bias and lead layers 136 include a second hard bias layer 144 and a second lead layer 146. The hard bias layers 141 and 144 cause a magnetic field to extend longitudinally through the spin valve sensor 74 for stabilizing the magnetic domains therein. The spin valve sensor 74 and the first and second hard bias and lead layers 134 and 136 are located between the nonmagnetic electrically insulative first and second read gap layers 76 and 78. The first and second read gap layers 76 and 78 are, in turn, located between the ferromagnetic first and second shield layers 80 and 82.

Figure 12:
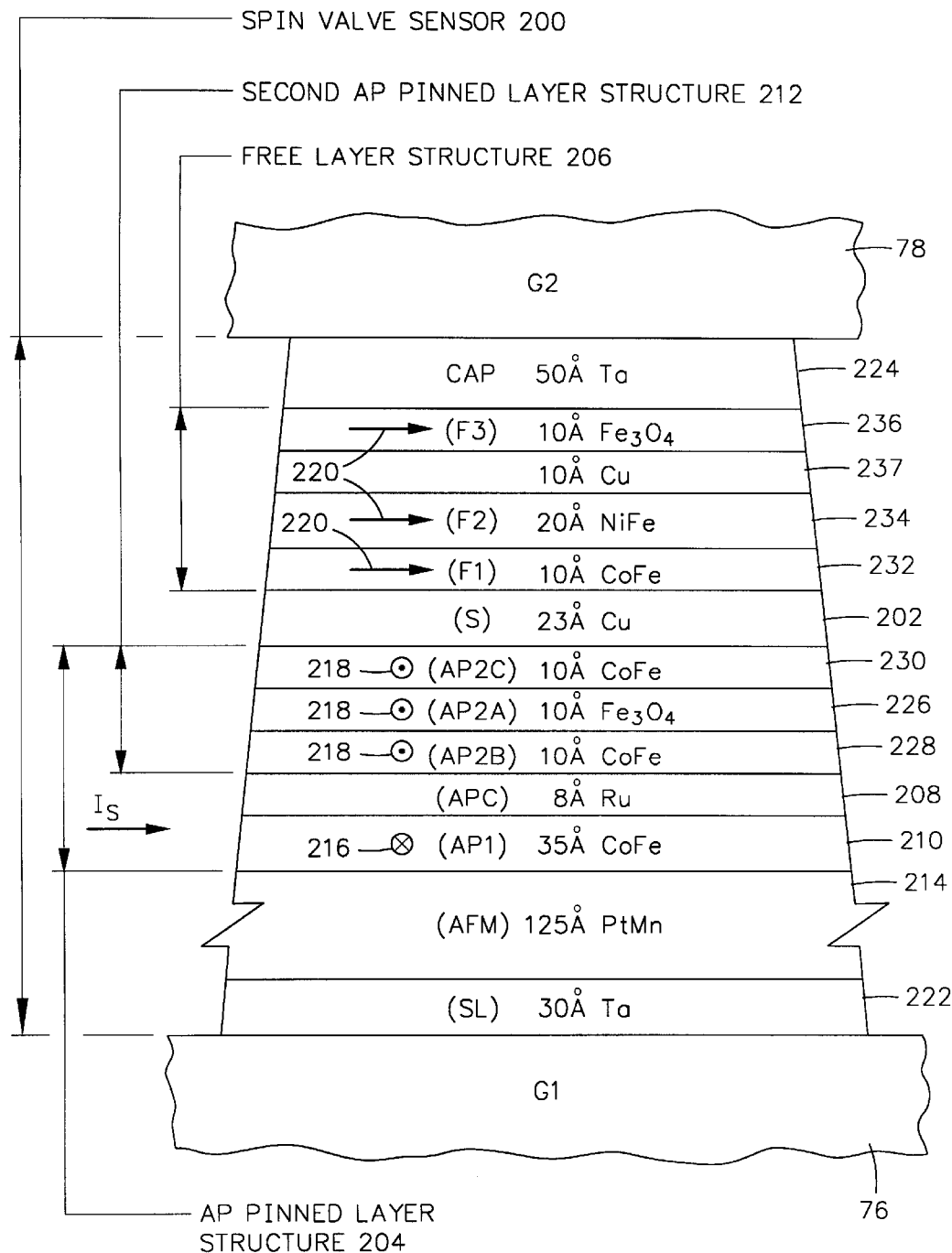
FIG. 12 is an ABS illustration of a first embodiment of the present invention.

FIG. 12 is a first embodiment of the present invention which includes a spin valve sensor 200 located between the first and second read gap layers 76 and 78. The spin valve sensor 200 includes a nonmagnetic electrically conductive spacer layer (S) 202 which is located between an antiparallel (AP) pinned layer structure 204 and a free layer structure 206. The AP pinned layer structure 204 includes an antiparallel coupling layer (APC) 208 which is located between first and second AP pinned layers (AP1) and (AP2) 210 and 212. The first AP pinned layer 210 interfaces and is exchange coupled to an antiferromagnetic layer (AFM) 214 so that a magnetic moment 216 of the first AP pinned layer is oriented perpendicular to the ABS, either into or out of the sensor, such as into the sensor as shown in FIG. 12. By a strong antiparallel coupling between the first and second AP pinned layers 210 and 212 a magnetic moment 218 of the second AP pinned layer is oriented antiparallel to the magnetic moment 216. The free layer structure 206 has a magnetic moment 220 which is oriented parallel to the ABS and the major planes of the layers in a direction from right to left or from left to right, as shown in FIG. 12. When a field signal from a rotating magnetic disk rotates the magnetic moment 220 of the free layer upwardly into the head the magnetic moments 220 and 218 become more antiparallel which increases the resistance of the spin valve sensor to a sense current $I_S$ and when a field signal from the rotating magnetic disk rotates the magnetic moment 220 downwardly out of the sensor the magnetic moments 220 and 218 become more parallel which reduces the resistance of the spin valve sensor. These increases and decreases in the resistance of the spin valve sensor are processed as playback signals by the processing circuitry 50 in FIG. 3. In order to promote a favorable texture of the layers of the spin valve sensor between the first and second read gap layers 76 and 78 a seed layer (SL) 222 may be employed and in order to protect the free layer structure 206 from subsequent processing steps a cap layer 224 may be employed.

The second AP pinned layer 212 includes a spin filter and specular reflector layer (AP2A) 226 which is located between first and second layers (AP2B) and (AP2C) 228 and 230. The spin filter and specular reflector layer 226 is composed of half metallic phase iron oxide ($Fe_3O_4$). This layer has the capability of filtering out minority electrons by conducting them away from the spin scattering region while reflecting majority electrons back into the spin scattering region. The first and second layers 228 and 230 are preferably cobalt iron (CoFe).

The free layer structure 206 includes first, second and third free layers (F1), (F2) and (F3) 232, 234 and 236 with a copper layer 237 between layers 234 and 236. The first free layer 232 is preferably composed of cobalt iron and interfaces the spacer layer 202 for improving the magnetoresistive coefficient dr/R, the second free layer 234 is preferably nickel iron for improving the magnetic softness of the free layer structure 206 and the third free layer 236 is a spin filter specular reflector layer which is composed of half metallic phase iron oxide ($Fe_3O_4$). The copper layer 237 prevents the iron oxide layer 236 from decreasing the magnetic softness of the layer 234. The spin filter and specular reflector layer 236 filters out minority electrons in the spin scattering region by conducting them away from this region while reflecting majority electrons back into the spin scattering region for increasing the magnetoresistive coefficient dr/R.

It should be understood that the invention encompasses the employment of both spin filter and specular reflector layers 226 and 236 as shown in FIG. 12 or alternately, only the spin filter and specular reflector layer 226 in the AP pinned layer structure 204 or the spin filter and specular reflector layer 236 in the free layer structure 206. The preferred embodiment, however, is to employ both of the spin filter and specular reflector layers 226 and 236, as shown in FIG. 12, for maximizing the magnetoresistive coefficient dr/R.

Exemplary thicknesses and materials of the layers are 20 Å of tantalum for the seed layer 222, 125 Å of platinum manganese for the pinning layer 214, 35 Å of cobalt iron for the first AP pinned layer 210, 8 Å of ruthenium for the antiparallel coupling layer 208, 10 Å of cobalt iron for the layer 228, 10 Å of half metallic phase iron oxide ($Fe_3O_4$) for the layer 226, 10 Å of cobalt iron for the layer 230, 23 Å of copper for the spacer layer 202, 10 Å of cobalt iron for the first free layer 232, 20 Å of nickel iron for the second free layer 234, 10 Å of half metallic phase iron oxide ($Fe_3O_4$) for the third free layer 236, 10 Å of copper for the layer 237 and 50 Å of tantalum for the cap layer 224.

Figure 13:
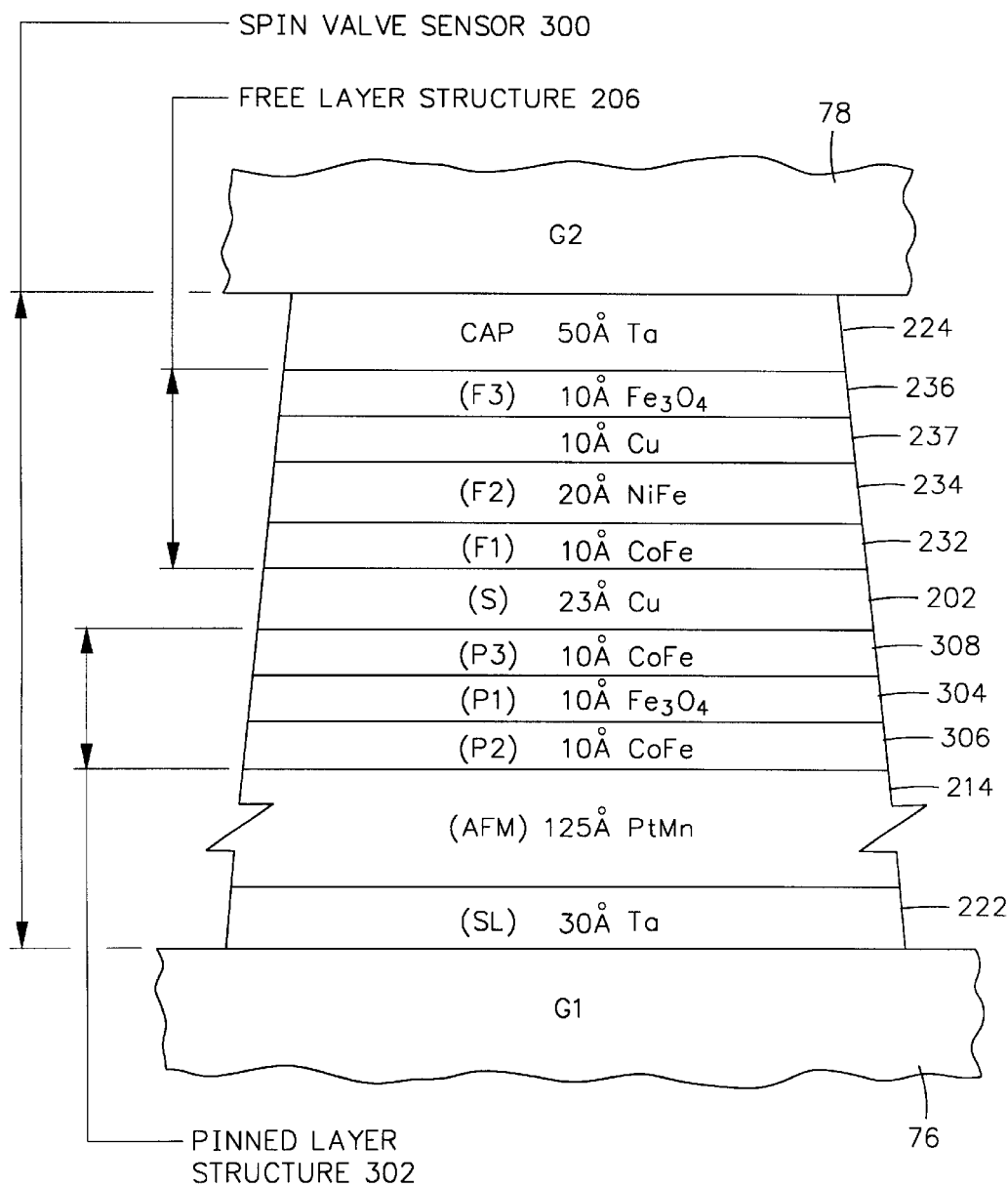
FIG. 13 is an ABS illustration of a second embodiment of the present invention.

FIG. 13 is an ABS illustration of the second embodiment of the present invention wherein a spin valve sensor 300 is located between the first and second read gap layers 76 and 78. The spin valve sensor 300 is the same as the spin valve sensor 200 in FIG. 12 except for the pinned layer structure 302 in FIG. 13. The pinned layer structure 302 includes first, second and third pinned layers (P1), (P2) and (P3) 304, 306 and 308. The first pinned layer 304 is a spin filter and specular reflector layer which is composed of half metallic phase iron oxide ($Fe_3O_4$) and is located between and interfaces the second and third pinned layers 306 and 308 which are preferably composed of cobalt iron. The spin filter and specular reflector layer 304 filters out minority electrons by conducting them away from the spin scattering region of the spin sensor while reflecting majority electrons back into the spin scattering region for increasing the magnetoresistive coefficient dr/R of the spin valve sensor 300. Exemplary thicknesses and materials of the layers 304, 306 and 308 are 10 Å of iron oxide ($Fe_3O_4$) for the first pinned layer 304, 10 Å of cobalt iron for the first pinned layer 306 and 10 Å of cobalt iron for the third pinned layer 308. The major difference between FIGS. 13 and 12 is that in FIG. 13 a single pinned layer structure 302 is employed instead of an AP pinned layer structure 204. This results in the spin valve sensor 300 having a higher demagnetizing field from the pinned layer structure 302 than the demagnetizing field from the pinned layer structure 204 in FIG. 12. It is preferred that both of the spin filter and specular reflector layers 304 and 236 be employed, however, optionally either of the layers 304 and 236 may be employed without the other as desired.

Figure 14:
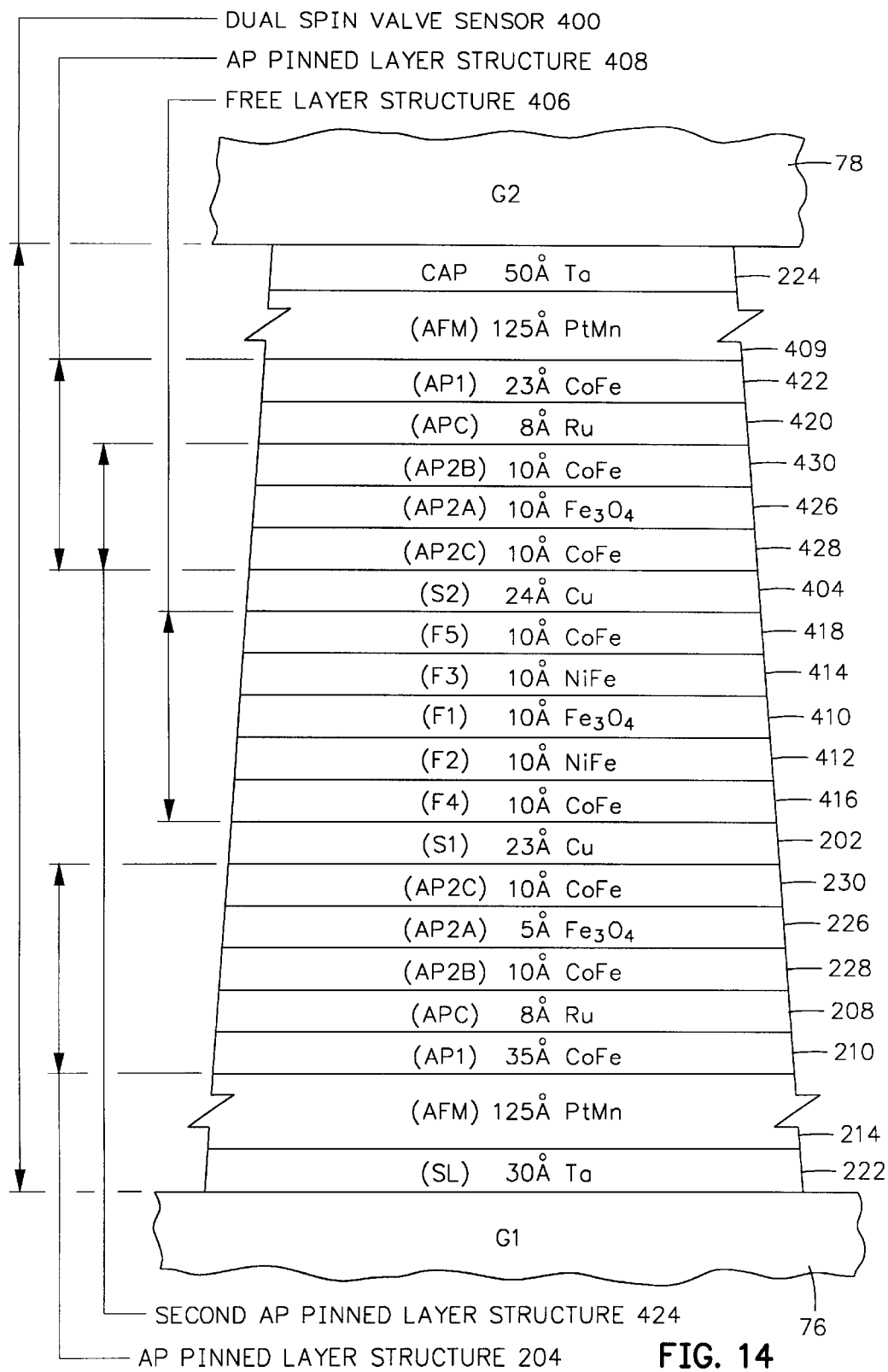
FIG. 14 is an ABS illustration of a third embodiment of the present invention.

FIG. 14 is an ABS illustration of a third embodiment of the present invention wherein a dual spin valve sensor 400 is located between the first and second read gap layers 76 and 78. The dual spin valve sensor 400 is the same as the spin valve sensor 200 in FIG. 12 except for a second spacer layer (S2) 404, a free layer structure 406, an antiparallel (AP) pinned layer structure 408 and another AFM pinning layer 409 composed of 125 Å of platinum manganese. The free layer structure 406 includes first through fifth free layers (F1)–(F5) 410, 412, 414, 416 and 418 wherein the first free layer 410 is a spin filter and specular reflector layer composed of 10 Å of half metallic phase iron oxide ($Fe_3O_4$), the second and third free layers 412 and 414 are 10 Å of nickel iron and the fourth and fifth free layers 416 and 418 are 10 Å of cobalt iron. In this dual spin valve sensor embodiment the spin filter and specular reflector layer 410 in the free layer structure conducts minority electrons from one spin scattering region into another spin scattering region while reflecting majority electrons into each of the spin scattering regions. Optionally, the layer 410 may be omitted, especially when the other free layers 412, 414, 416 and 418 are thin as shown in FIG. 14.

The AP pinned layer structure 408 includes an antiparallel coupling (APC) layer 420 which is located between first and second AP pinned layers (AP1) and (AP2) 422 and 424. The second AP pinned layer 424 includes first, second and third layers (AP2A), (AP2B) and (AP2C) 426, 428 and 430 wherein the first layer 426 is a spin filter and specular reflector layer composed of 10 Å of half metallic phase iron oxide ($Fe_3O_4$) and each of the second and third layers 428 and 430 are composed of 1 Å of cobalt iron. The dual spin valve sensor 400 in FIG. 14 has two spin scattering regions generally located at the first and second spacer layers 402 and 404 so that two spin scattering events occur for increasing the magnetoresistive coefficient dr/R of the overall spin valve sensor. In this embodiment the spin filter and specular reflector layers 228 and 426 filter out minority electrons away from the spin scattering regions while reflecting the majority electrons back into the spin scattering region for increasing the magnetoresistive coefficient dr/R of the sensor.

Discussion

It should be understood that the thicknesses and materials of the layers described hereinabove, except for the specific use of the half metallic phase iron oxide ($Fe_3O_4$), are optional. Cobalt may be used in lieu of cobalt iron and other antiferromagnetic materials such as nickel manganese and iridium manganese may be used in lieu of platinum manganese for the pinning layers. The cobalt iron is preferably $Co_{90}Fe_{10}$, the nickel iron is preferably $Ni_{83}Fe_{17}$ and the platinum manganese is preferably $Pt_{50}Mn_{50}$.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A magnetic read head which has an air bearing surface (ABS), comprising:
a spin valve sensor including:
a ferromagnetic first pinned layer structure that has a magnetic moment;
an antiferromagnetic first pinning layer exchange coupled to the first pinned layer structure for pinning the magnetic moment of the first pinned layer structure;
a free layer structure; and
a nonmagnetic conductive first spacer layer located between the free layer structure and the first pinned layer structure;
the free layer structure including:
a first layer composed of cobalt or cobalt iron and interfacing the spacer layer;
a second layer composed of nickel iron;
a third layer composed of half metallic phase iron oxide $Fe_3O_4$; and
the second layer being located between the first and third layers;
the first pinned layer structure including:
a first pinned layer composed of cobalt or cobalt iron and interfacing the pinning layer;
a second layer composed of half metallic phase iron oxide $Fe_3O_4$;
a third layer composed of cobalt or cobalt iron and interfacing the first spacer layer; and
the second layer being located between the first and third layers.

2. A magnetic read head as claimed in claim 1 including:
nonmagnetic nonconductive first and second read gap layers;
the spin valve sensor being located between the first and second read gap layers;
ferromagnetic first and second shield layers; and
the first and second read gap layers being located between the first and second shield layers.

3. A magnetic read head which has an air bearing surface (ABS), comprising:
a spin valve sensor including:
a ferromagnetic first pinned layer structure that has a magnetic moment;
an antiferromagnetic first pinning layer exchange coupled to the first pinned layer structure for pinning the magnetic moment of the first pinned layer structure;
a free layer structure;
a nonmagnetic conductive first spacer layer located between the free layer structure and the first pinned layer structure;
a second pinned layer structure;
a second antiferromagnetic pinning layer exchange coupled to the second pinned layer structure;
a nonmagnetic electrically conductive second spacer layer located between the second pinned layer structure and the free layer structure;
the free layer structure including:
a first free layer composed of cobalt or cobalt iron and interfacing the first spacer layer;
a second free layer composed of nickel iron;
a third free layer composed of half metallic phase iron oxide $Fe_3O_4$;
the second free layer being located between the first and third layers;

a fourth free layer composed of nickel iron;
a fifth free layer composed of cobalt or cobalt iron and interfacing the second spacer layer; and
the fourth free layer being located between the third and fifth free layers;
the first pinned layer structure including first and second antiparallel (AP) pinned layers and an antiparallel (AP) coupling layer with the AP coupling layer located between the first and second AP pinned layers;
the second AP pinned layer of the first pinned layer structure including a first film composed of said metallic phase iron oxide $Fe_3O_4$ and second and third films composed of cobalt or cobalt iron with the second film interfacing said AP coupling layer, the third film interfacing the first spacer layer and the first film being located between the second and third films;
the second pinned layer structure including first and second antiparallel (AP) pinned layers and an antiparallel (AP) coupling layer with the AP coupling layer located between the first and second AP pinned layers; and
the first AP pinned layer of the second pinned layer structure including a first film composed of said metallic phase iron oxide $Fe_3O_4$ and second and third films composed of cobalt or cobalt iron with the second film interfacing the second spacer layer, the third film interfacing the AP coupling layer and the first film being located between the second and third films.

4. A magnetic head assembly having an air bearing surface (ABS), comprising:
a write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and
a read head including:
a spin valve sensor;
nonmagnetic nonconductive first and second read gap layers;
the spin valve sensor being located between the first and second read gap layers;
a ferromagnetic first shield layer; and
the first and second gap layers being located between the first shield layer and the first pole piece layer; and
the spin valve sensor including:
a ferromagnetic first pinned layer structure that has a magnetic moment;
an antiferromagnetic first pinning layer exchange coupled to the first pinned layer structure for pinning the magnetic moment of the first pinned layer structure;
a free layer structure; and
a nonmagnetic conductive first spacer layer located between the free layer structure and the first pinned layer structure;
the free layer structure including:
a first layer composed of cobalt or cobalt iron and interfacing the spacer layer;
a second layer composed of nickel iron;
a third layer composed of half metallic phase iron oxide $Fe_3O_4$; and
the second layer being located between the first and third layers;
the pinned layer structure including:
a first pinned layer composed of cobalt or cobalt iron and interfacing the pinning layer;
a second layer composed of half metallic phase iron oxide $Fe_3O_4$;
a third layer composed of cobalt or cobalt iron and interfacing the first spacer layer; and
the second layer being located between the first and third layers.

5. A magnetic head assembly as claimed in claim 4 including:
a ferromagnetic second shield layer;
a nonmagnetic isolation layer located between the second shield layer and the first pole piece layer.

6. A magnetic read head which has an air bearing surface (ABS), comprising:
a spin valve sensor including:
a ferromagnetic first pinned layer structure that has a magnetic moment;
an antiferromagnetic first pinning layer exchange coupled to the first pinned layer structure for pinning the magnetic moment of the first pinned layer structure;
a free layer structure; and
a nonmagnetic conductive first spacer layer located between the free layer structure and the first pinned layer structure;
a second pinned layer structure;
a second antiferromagnetic pinning layer exchange coupled to the second pinned layer structure;
a nonmagnetic electrically conductive second spacer layer located between the second pinned layer structure and the free layer structure;
the free layer structure including:
a first free layer composed of cobalt or cobalt iron and interfacing the first spacer layer;
a second free layer composed of nickel iron;
a third free layer composed of half metallic phase iron oxide $Fe_3O_4$;
the second free layer being located between the first and third layers;
a fourth free layer composed of nickel iron;
a fifth free layer composed of cobalt or cobalt iron and interfacing the second spacer layer; and
the fourth free layer being located between the third and fifth free layers;
the first pinned layer structure including first and second antiparallel (AP) pinned layers and an antiparallel (AP) coupling layer with the AP coupling layer located between the first and second AP pinned layers;
the second AP pinned layer of the first pinned layer structure including a first film composed of said metallic phase iron oxide $Fe_3O_4$ and second and third films composed of cobalt or cobalt iron with the second film interfacing said AP coupling layer, the third film interfacing the first spacer layer and the first film being located between the second and third films;
the second pinned layer structure including first and second antiparallel (AP) pinned layers and an antiparallel (AP) coupling layer with the AP coupling layer located between the first and second AP pinned layers; and
the first AP pinned layer of the second pinned layer structure including a first film composed of said metallic phase iron oxide $Fe_3O_4$ and second and third films composed of cobalt or cobalt iron with the second film interfacing the second spacer layer, the third film interfacing the AP coupling layer and the first film being located between the second and third films.

7. A magnetic disk drive including at least one magnetic head assembly that has a write head, a read head and an air bearing surface (ABS) comprising:
the write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and
the read head including:
a spin valve sensor;
nonmagnetic nonconductive first and second read gap layers;
the spin valve sensor being located between the first and second read gap layers;
a ferromagnetic first shield layer; and
the first and second read gap layers being located between the first shield layer and the first pole piece layer; and
the spin valve sensor including:
a ferromagnetic first pinned layer structure that has a magnetic moment;
an antiferromagnetic first pinning layer exchange coupled to the first pinned layer structure for pinning the magnetic moment of the first pinned layer structure;
a free layer structure; and
a nonmagnetic conductive first spacer layer located between the free layer structure and the first pinned layer structure;
the free layer structure including:
a first layer composed of cobalt or cobalt iron and interfacing the spacer layer;
a second layer composed of nickel iron;
a third layer composed of half metallic phase iron oxide $Fe_3O_4$; and
the second layer being located between the first and third layers;
the first pinned layer structure including:
a first pinned layer composed of cobalt or cobalt iron and interfacing the pinning layer;
a second layer composed of half metallic phase iron oxide $Fe_3O_4$;
a third layer composed of cobalt or cobalt iron and interfacing the first spacer layer; and
the second layer being located between the first and third layers;
a housing;
a magnetic disk rotatably supported in the housing;
a support mounted in the housing for supporting the magnetic head assembly with said ABS facing the magnetic disk so that the magnetic head assembly is in a transducing relationship with the magnetic disk;
a spindle motor for rotating the magnetic disk;
an actuator positioning means connected to the support for moving the magnetic head assembly to multiple positions with respect to said magnetic disk; and
a processor connected to the magnetic head assembly, to the spindle motor and to the actuator for exchanging signals with the magnetic head assembly, for controlling movement of the magnetic disk and for controlling the position of the magnetic head assembly.

8. A magnetic disk drive as claimed in claim 7 including:
a ferromagnetic second shield layer;
a nonmagnetic isolation layer located between the second shield layer and the first pole piece layer.

9. A magnetic read head which has an air bearing surface (ABS), comprising:
a spin valve sensor including:
a ferromagnetic first pinned layer structure that has a magnetic moment;
an antiferromagnetic first pinning layer exchange coupled to the first pinned layer structure for pinning the magnetic moment of the first pinned layer structure;
a free layer structure; and
a nonmagnetic conductive first spacer layer located between the free layer structure and the first pinned layer structure;
a second pinned layer structure;
a second antiferromagnetic pinning layer exchange coupled to the second pinned layer structure;
a nonmagnetic electrically conductive second spacer layer located between the second pinned layer structure and the free layer structure;
the free layer structure including:
a first free layer composed of cobalt or cobalt iron and interfacing the first spacer layer;
a second free layer composed of nickel iron;
a third free layer composed of half metallic phase iron oxide $Fe_3O_4$;
the second free layer being located between the first and third layers;
a fourth free layer composed of nickel iron;
a fifth free layer composed of cobalt or cobalt iron and interfacing the second spacer layer; and
the fourth free layer being located between the third and fifth free layers;
the first pinned layer structure including first and second antiparallel (AP) pinned layers and an antiparallel (AP) coupling layer with the AP coupling layer located between the first and second AP pinned layers;
the second AP pinned layer of the first pinned layer structure including a first film composed of said metallic phase iron oxide $Fe_3O_4$ and second and third films composed of cobalt or cobalt iron with the second film interfacing said AP coupling layer, the third film interfacing the first spacer layer and the first film being located between the second and third films;
the second pinned layer structure including first and second antiparallel (AP) pinned layers and an antiparallel (AP) coupling layer with the AP coupling layer located between the first and second AP pinned layers; and
the first AP pinned layer of the second pinned layer structure including a first film composed of said metallic phase iron oxide $Fe_3O_4$ and second and third films composed of cobalt or cobalt iron with the second film interfacing the second spacer layer, the third film interfacing the AP coupling layer and the first film being located between the second and third films.

10. A method of making a magnetic read head which has an air bearing surface (ABS), comprising the steps of:
   a making a spin valve sensor comprising the steps of:
      forming a ferromagnetic first pinned layer structure that has a magnetic moment;
      forming an antiferromagnetic first pinning layer exchange coupled to the first pinned layer structure for pinning the magnetic moment of the first pinned layer structure;
      forming a free layer structure;
      forming a nonmagnetic conductive first spacer layer between the free layer structure and the first pinned layer structure;
      forming the free layer structure comprising the steps of:
         forming a first layer composed of cobalt iron and interfacing the spacer layer;
         forming a second layer composed of nickel iron;
         forming a third layer composed of said half metallic phase iron oxide $Fe_3O_4$; and
         locating the second layer between the first and third layers;
      forming the pinned layer structure comprising the steps of:
         forming a first pinned layer composed of cobalt or cobalt iron and interfacing the pinning layer;
         forming a second layer composed of half metallic phase iron oxide $Fe_3O_4$;
         forming a third layer composed of cobalt or cobalt iron and interfacing the first spacer layer; and
         locating the second layer between the first and third layers.

11. A method as claimed in claim 10 including the steps of:
   forming nonmagnetic nonconductive first and second read gap layers with the spin valve sensor located between the first and second read gap layers; and
   forming ferromagnetic first and second shield layers with the first and second read gap layers located between the first and second shield layers.

12. A method of making a magnetic read head which has an air bearing surface (ABS), comprising the steps of:
   a making a spin valve sensor comprising the steps of:
      forming a ferromagnetic first pinned layer structure that has a magnetic moment;
      forming an antiferromagnetic first pinning layer exchange coupled to the first pinned layer structure for pinning the magnetic moment of the first pinned layer structure;
      forming a free layer structure;
      forming a nonmagnetic conductive first spacer layer between the free layer structure and the first pinned layer structure;
   forming a second pinned layer structure;
   forming a second antiferromagnetic pinning layer exchange coupled to the second pinned layer structure;
   forming a nonmagnetic electrically conductive second spacer layer between the second pinned layer structure and the free layer structure;
   forming the free layer structure comprising the steps of:
      forming a first free layer composed of cobalt or cobalt iron and interfacing the first spacer layer;
      forming a second free layer composed of nickel iron;
      forming a third free layer composed of half metallic phase iron oxide $Fe_3O_4$ with the second free layer located between the first and third layer;
      forming a fourth free layer composed of nickel iron;
      forming a fifth free layer composed of cobalt or cobalt iron and interfacing the second spacer layer with the fourth free layer located between the third and fifth free layers;
   forming the pinned layer structure comprising the steps of:
      the forming of the first pinned layer structure including forming first and second antiparallel (AP) pinned layers and an antiparallel (AP) coupling layer with the AP coupling layer located between the first and second AP pinned layers;
      the forming of the second AP pinned layer of the first pinned layer structure including forming a first film of said metallic phase iron oxide $Fe_3O_4$ and second and third films of cobalt or cobalt iron with the second film interfacing said AP coupling layer, the third film interfacing the first spacer layer and the first film located between the second and third films;
      the forming of the second pinned layer structure including forming first and second antiparallel (AP) pinned layers and an antiparallel (AP) coupling layer with the AP coupling layer located between the first and second AP pinned layers; and
      the forming of the first AP pinned layer of the second pinned layer structure including forming a first film of said metallic phase iron oxide $Fe_3O_4$ and second and third films of cobalt or cobalt iron with the second film interfacing the second spacer layer, the third film interfacing the AP coupling layer and the first film located between the second and third films.

13. A method of making magnetic head assembly that has an air bearing surface (ABS), comprising the steps of:
   making a write head including the steps of:
      forming ferromagnetic first and second pole piece layers in pole tip, yoke and back gap regions wherein the yoke region is located between the pole tip and back gap regions;
      forming a nonmagnetic nonconductive write gap layer between the first and second pole piece layers in the pole tip region;
      forming an insulation stack with at least one coil layer embedded therein between the first and second pole piece layers in the yoke region; and
      connecting the first and pole piece layers at said back gap region; and
   making a read head including the steps of:
      forming nonmagnetic nonconductive first and second read gap layers;
      forming a spin valve sensor between the first and second read gap layers;
      forming a ferromagnetic first shield layer;
      forming the first and second read gap layers between the first shield layer and the first pole piece layer; and
   a making of the spin valve sensor comprising the steps of:
      forming a ferromagnetic first pinned layer structure that has a magnetic moment;
      forming an antiferromagnetic first pinning layer exchange coupled to the first pinned layer structure for pinning the magnetic moment of the first pinned layer structure;
      forming a free layer structure;
      forming a nonmagnetic conductive first spacer layer between the free layer structure and the first pinned layer structure;
   forming the free layer structure comprising the steps of:

forming a first layer composed of cobalt iron and interfacing the spacer layer;

forming a second layer composed of nickel iron;

forming a third layer composed of said half metallic phase iron oxide $Fe_3O_4$; and locating the second layer between the first and third layers;

forming the pinned layer structure comprising the steps of:

forming a first pinned layer composed of cobalt or cobalt iron and interfacing the pinning layer;

forming a second layer composed of half metallic phase iron oxide $Fe_3O_4$;

forming a third layer composed of cobalt or cobalt iron and interfacing the first spacer layer; and locating the second layer between the first and third layers.

14. A method as claimed in claim 13 including the steps of:

forming a ferromagnetic second shield layer; and forming a nonmagnetic isolation layer between the second shield layer and the first pole piece layer.

15. A method of making a magnetic read head which has an air bearing surface (ABS), comprising the steps of:

a making a spin valve sensor comprising the steps of:

forming a ferromagnetic first pinned layer structure that has a magnetic moment;

forming an antiferromagnetic first pinning layer exchange coupled to the first pinned layer structure for pinning the magnetic moment of the first pinned layer structure;

forming a free layer structure;

forming a nonmagnetic conductive first spacer layer between the free layer structure and the first pinned layer structure;

forming a second pinned layer structure;

forming a second antiferromagnetic pinning layer exchange coupled to the second pinned layer structure;

forming a nonmagnetic electrically conductive second spacer layer between the second pinned layer structure and the free layer structure;

forming the free layer structure comprising the steps of:

forming a first free layer composed of cobalt or cobalt iron and interfacing the first spacer layer;

forming a second free layer composed of nickel iron;

forming a third free layer composed of half metallic phase iron oxide $Fe_3O_4$ with the second free layer located between the first and third layer;

forming a fourth free layer composed of nickel iron;

forming a fifth free layer composed of cobalt or cobalt iron and interfacing the second spacer layer with the fourth free layer located between the third and fifth free layers;

forming the pinned layer structure comprising the steps of:

the forming of the first pinned layer structure including forming first and second antiparallel (AP) pinned layers and an antiparallel (AP) coupling layer with the AP coupling layer located between the first and second AP pinned layers;

the forming of the second AP pinned layer of the first pinned layer structure including forming a first film of said metallic phase iron oxide $Fe_3O_4$ and second and third films of cobalt or cobalt iron with the second film interfacing said AP coupling layer, the third film interfacing the first spacer layer and the first film located between the second and third films;

the forming of the second pinned layer structure including forming first and second antiparallel (AP) pinned layers and an antiparallel (AP) coupling layer with the AP coupling layer located between the first and second AP pinned layers; and the forming of the first AP pinned layer of the second pinned layer structure including forming a first film of said metallic phase iron oxide $Fe_3O_4$ and second and third films of cobalt or cobalt iron with the second film interfacing the second spacer layer, the third film interfacing the AP coupling layer and the first film located between the second and third films.

* * * * *

UNITED STATES PATENT AND TRADEMARK OFFICE
CERTIFICATE OF CORRECTION

PATENT NO. : 6,693,776 B2
DATED : February 17, 2004
INVENTOR(S) : Gill

It is certified that error appears in the above-identified patent and that said Letters Patent is hereby corrected as shown below:

<u>Title page,</u>
Item [56], References Cited, after "U.S. PATENT DOCUMENTS, insert:
-- 5,598,308   01/1997        Dieny et al....   360/113
   5,920,446   07/1999        Gill ............   360/113
   5,932,343   08/1999        Hayashi et al..   360/113x
   5,949,622   09/1999        Kamiguchi et al.  360/113
        FOREIGN PATENT DOCUMENTS
DE 19652536         06/1997        Denmark
EP 845820           06/1998        Europe
WO 95/10123         04/1995
        OTHER PUBLICATIONS
*IEEE MAG* - 33 n. 5, September 1997, pp 3500ff
*IBM Technical Disclosure Bulletin*, Vol. 40, No. 04,
    April 1997, pp. 97-98, "Spin Valve Read Head with
    Fe/Al/203/Fe/NiFe Tunneling Junction" --

Signed and Sealed this

Twenty-fifth Day of May, 2004

JON W. DUDAS
*Acting Director of the United States Patent and Trademark Office*